(12) United States Patent
Rotem et al.

(10) Patent No.: US 8,547,375 B2
(45) Date of Patent: Oct. 1, 2013

(54) METHODS FOR TRANSFERRING POINTS OF INTEREST BETWEEN IMAGES WITH NON-PARALLEL VIEWING DIRECTIONS

(75) Inventors: Efrat Rotem, Haifa (IL); Gilad Adiv, Haifa (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 163 days.

(21) Appl. No.: 12/922,855

(22) PCT Filed: Mar. 19, 2009

(86) PCT No.: PCT/IB2009/051161
§ 371 (c)(1),
(2), (4) Date: Sep. 16, 2010

(87) PCT Pub. No.: WO2009/122316
PCT Pub. Date: Oct. 8, 2009

(65) Prior Publication Data
US 2011/0012900 A1   Jan. 20, 2011

(30) Foreign Application Priority Data

Mar. 31, 2008 (IL) .......................................... 190539

(51) Int. Cl.
*G06T 15/00* (2011.01)
*G06K 9/00* (2006.01)

(52) U.S. Cl.
USPC .......................................... 345/419; 382/154

(58) Field of Classification Search
None
See application file for complete search history.

(56) References Cited

U.S. PATENT DOCUMENTS 3,748,644 A * 7/1973 Tisdale .......................... 382/201
5,550,937 A * 8/1996 Bell et al. ...................... 382/293

(Continued)

FOREIGN PATENT DOCUMENTS

EP         1857978       11/2007
WO    WO2007135671      11/2007
WO    WO 2007135671 A2 * 11/2007

OTHER PUBLICATIONS

Rodriguez J J et al:"Matching Aerial Images to 3-D Terrain Maps" IEEE Transactions on Pattern Analysis and Mashine Intelligence, IEEE Service Center, Los Alamitos, CA, US, vol. 12, No. 12, Dec. 1, 1990, pp. 1138-1149.
Wildes R P et al:"Video Georegistration: Algorithm and Quantitative Evaluation" Proceedings of the Eight IEEE International Conference on Computer Vision.(ICCV), Vancouver, British Columbia, Canada, Jul. 14, 2001, Los Alamitos, CA: IEEE Comp. Soc, US, vol. 2, Jul. 7, 2001, pp. 343-350.

(Continued)

*Primary Examiner* — Daniel Hajnik
*Assistant Examiner* — Jason Pringle-Parker
(74) *Attorney, Agent, or Firm* — Mark M. Friedman

(57) ABSTRACT

A method for identifying within a working image of a scene a point of interest designated within a designation image of a scene, the designation image being taken along a first viewing direction and the working image being taken along a second viewing direction, the second viewing direction being significantly non-parallel to the first viewing direction, the method comprising the steps of: obtaining a designation image of the scene; obtaining a working image of the scene; correlating said designation image and said working image with each other, directly or by correlating each of said designation image and said working image with a common reference image, so as to derive an interrelation between said designation image and said working image; and employing said interrelation between said designation image and said working image to derive a location within said working image of a point of interest designated within said designation image, characterized in that the method further comprises: obtaining a secondary designation image taken along a viewing direction displaced from, but similar to, the first viewing direction; and co-processing said designation image and said secondary designation image to derive range information relating to a plurality of pixels in said designation image, thereby defining a partial relative three-dimensional model of a portion of the scene relative to the viewing direction of said designation image, wherein said partial relative three-dimensional model is used in said step of correlating.

16 Claims, 3 Drawing Sheets

(56) References Cited

U.S. PATENT DOCUMENTS

| | | | | |
|---|---|---|---|---|
| 5,598,515 | A | * | 1/1997 | Shashua .................... 345/422 |
| 5,642,293 | A | * | 6/1997 | Manthey et al. ................ 702/42 |
| 5,995,681 | A | * | 11/1999 | Lee et al. .................... 382/293 |
| 6,990,230 | B2 | * | 1/2006 | Piponi ........................ 382/154 |
| 7,061,510 | B2 | * | 6/2006 | Rhoads ........................ 345/634 |
| 7,199,793 | B2 | * | 4/2007 | Oh et al. ..................... 345/419 |
| 7,983,474 | B2 | * | 7/2011 | Van Workum et al. ....... 382/154 |
| 2002/0042674 | A1 | * | 4/2002 | Mochizuki et al. ........... 701/211 |
| 2005/0271301 | A1 | * | 12/2005 | Solomon et al. ............. 382/294 |
| 2007/0002138 | A1 | * | 1/2007 | Oldroyd ...................... 348/143 |
| 2007/0247517 | A1 | | 10/2007 | Zhang et al. |
| 2009/0110267 | A1 | * | 4/2009 | Zakhor et al. ................ 382/154 |
| 2009/0141020 | A1 | * | 6/2009 | Freund et al. ................ 345/419 |
| 2009/0245691 | A1 | * | 10/2009 | Naimark et al. ............. 382/285 |

OTHER PUBLICATIONS

Park J-I et al:"Arbitrary View Generation From Multiple Cameras" Image Processing, 1997. Proceedings., International Conference on Santa Barbara, CA, USA Oct. 26-29, 1997, Los Alamitos, CA,USA, IEEE Comput, Soc, US ,vol. 1, Oct. 26, 1997, pp. 149-152.

Williams B D et al :"Tool for Computer-Assisted Geo-Spatial Registration and Truthing of Images of Differing Dimensionality and Resolution" Proceedings of the SPIE—The International Society for Optical Engineering SPIE—Int. Soc.Opt. Eng USA, vol. 4054, 2000, pp. 75-82.

Jinhui Hu et al:"Approaches to Large-Scale Urban Modeling" IEEE Computer Graphics and Applications, IEEE Service Center, New York, NY, US, vol. 23, No. 6, Nov. 1, 2003, pp. 62-69.

* cited by examiner

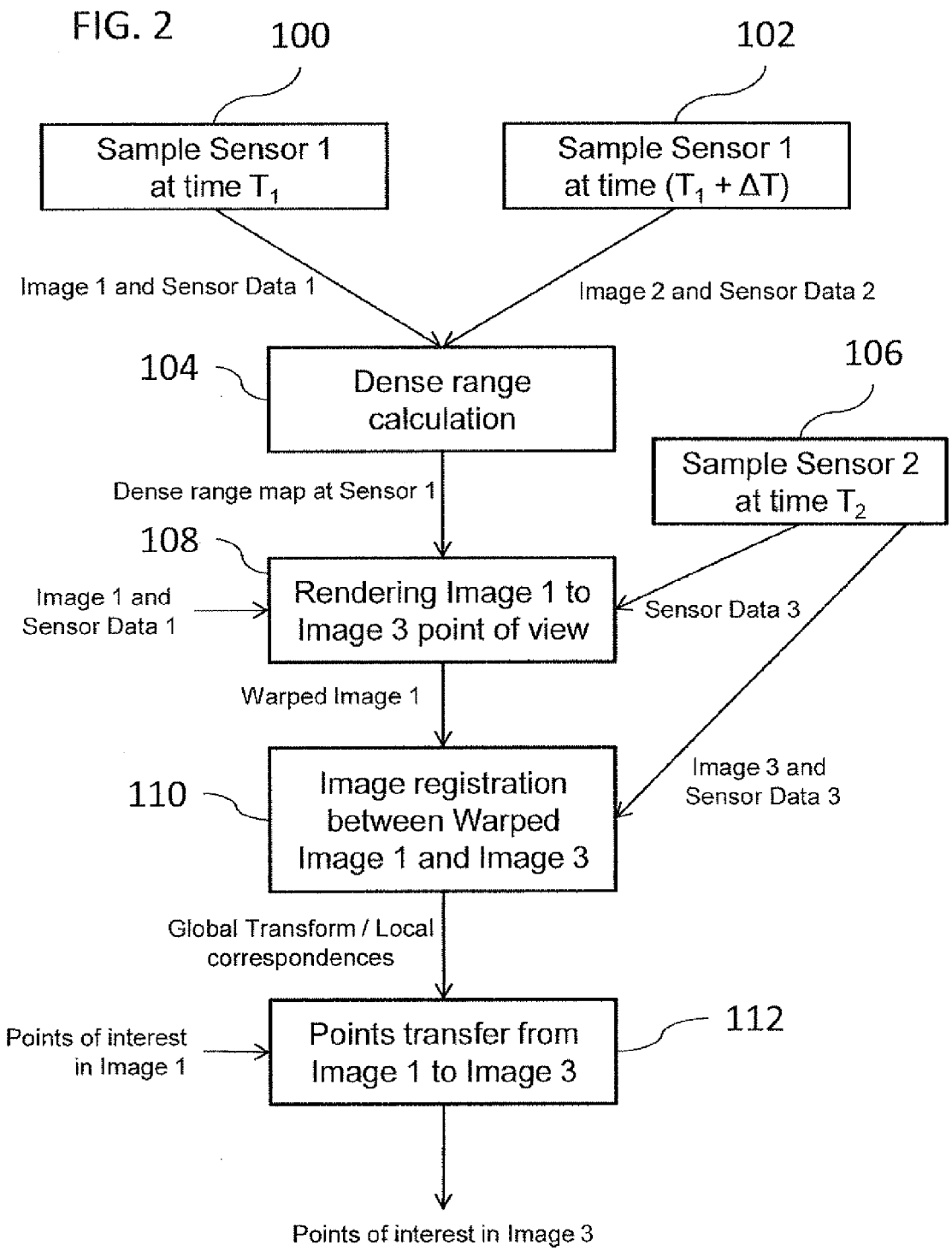

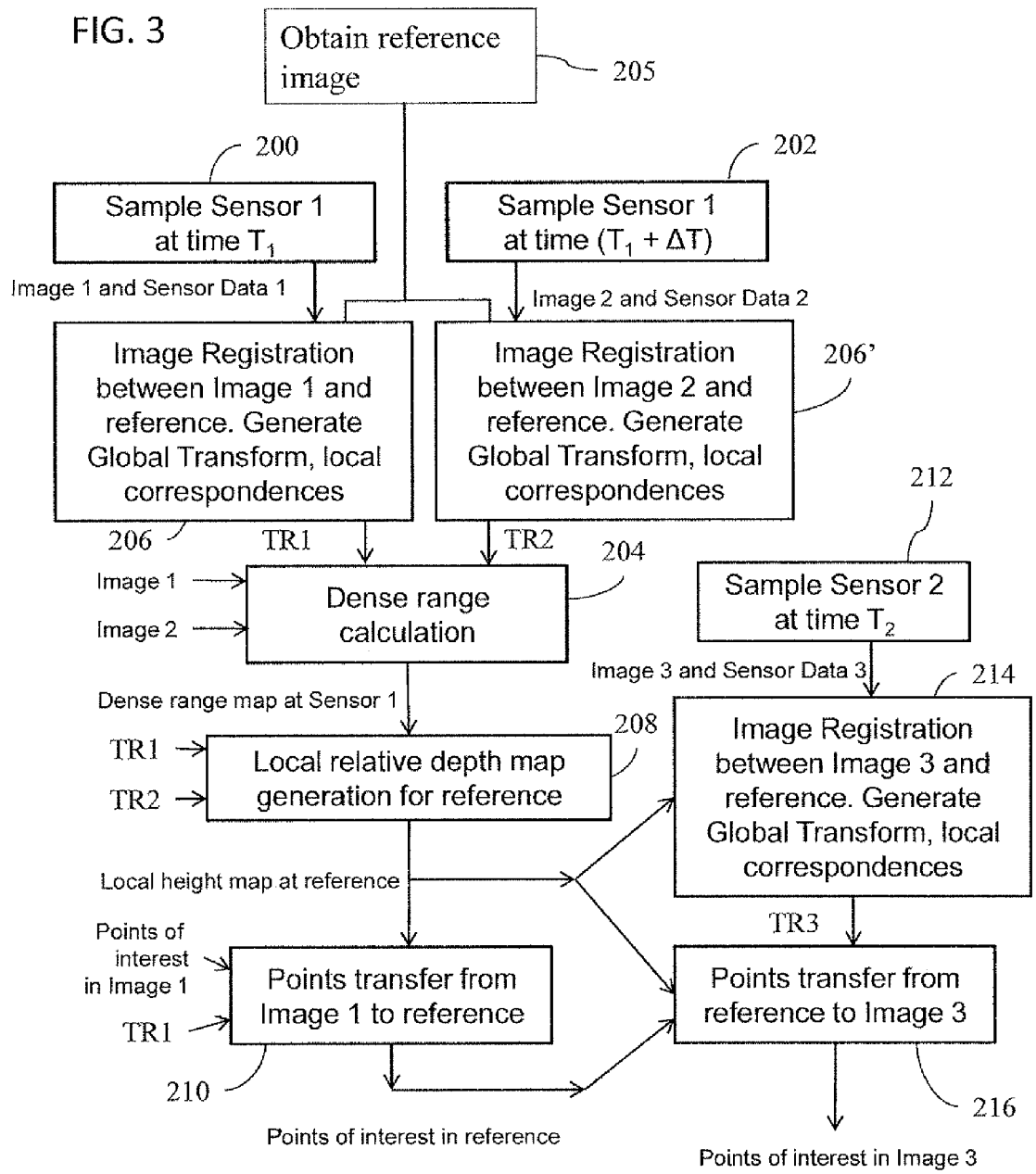

METHODS FOR TRANSFERRING POINTS OF INTEREST BETWEEN IMAGES WITH NON-PARALLEL VIEWING DIRECTIONS

RELATED APPLICATIONS

This patent application is a U.S. National Phase Application of PCT/IB2009/051161 filed on Mar. 19, 2009, which claims priority of Israeli Patent Application No. 190539 filed Mar. 31, 2008, the contents of which are incorporated herein by reference.

FIELD AND BACKGROUND OF THE INVENTION

The present invention relates to the field of image processing and, in particular, it concerns methods for locating in one perspective view a point of interest designated in another perspective view where the viewing directions of the two views are significantly non-parallel.

A common problem in the field of multi-platform field operations is communication of a point of interest between different platforms. Specifically, it is often desired to designate a particular location (e.g., pixel) within an image of a scene viewed from a first direction and then to determine the corresponding location (pixel) of the same point of interest in an image of the scene as viewed from a different direction. When the viewing directions are near-parallel, or where the scene is generally flat so that few features are obscured, this task can be achieved by well developed image processing techniques for image correlation which identify pairs of corresponding features in the two images and determine a transformation between the images which maps pixel-to-pixel between the images. For scenes with pronounced vertical topology, such as urban terrain, and where viewing directions are significantly non-parallel, the problem rapidly becomes much more difficult, if not insoluble.

The source of the aforementioned difficulty is intuitively understood if one considers two aerial cameras viewing a group of buildings from the West and from the East, respectively. Clearly, all features on the vertical faces of the buildings are not shared between the two images and cannot form a basis for conventional image correlation. Furthermore, if the buildings are densely positioned and the viewing angles shallow, much of the ground area between the buildings may be obscured in one or both images. As a result, the vast majority of the features in each image may not have corresponding features in the other image, leaving relatively few features, typically including parts of the building roofs, in common. As the proportion of corresponding features in the two images decreases, the reliability and accuracy of conventional image correlation techniques rapidly declines.

An alternative approach to transferring a point of interest between two perspective views is by registration of each image to a geographical image database. Each image is separately correlated to the corresponding subregion of an image retrieved from the geographical image database, and hence each pixel of each image is associated with a known geographical coordinate. The geographic coordinates then provide a common language to allow transfer of points of interest from one image to the other.

The use of a geographical reference image ("orthophoto" or satellite image) has certain advantages. Firstly, the use of an overhead view tends to limit the maximum angular discrepancy between viewing directions of the images to be correlated. Secondly, the digital terrain map (DTM) associated with the geographical database provides additional information which can be used to facilitate the correlation processing. Nevertheless, this approach also encounters major problems when dealing with urban terrain where the DTM typically lacks sufficient resolution and/or may not be sufficiently up-to-date to define building structures and the aforementioned problems of insufficient correspondence between features tend to occur.

For the above reasons, the generally accepted approach to field operations in urban terrain is that a full three-dimensional model of the external surfaces of the building structures should be determined. This may be achieved using structure-from-motion ("SFM") techniques in which features are tracked through successive frames of a video to derive locations of the features in three-dimensions, and the tracked features are then associated to identify surfaces of the structures. This model can then be used to provide additional information for any given viewing direction, thereby facilitating registration of each subsequent perspective view with the model and the transfer of points of interest to or from each image.

Although the three-dimensional model approach is highly effective, it is not always feasible in practical operations. Specifically, construction of a three-dimensional model requires acquisition of images from all directions around the buildings in question as well as computationally intensive processing. Limitations of time and/or accessibility in hostile territory may preclude this approach.

A further technical hurdle presented by the three-dimensional model approach is alignment of the model with the real-world geographic coordinate system. The geometrical form of the three-dimensional model, typically represented as a precise local elevation map, is a fundamentally different and incompatible form of data from the image data of an orthophoto or satellite image tied to the geographical coordinate system. In many cases, this alignment can only be performed reliably as a laborious manual procedure, rendering the technique impractical for automated or real-time operations.

There is therefore a need for methods for locating in one perspective view a point of interest designated in another perspective view where the viewing directions of the two views are significantly non-parallel, and particularly in urban terrain where full three-dimensional model data is unavailable.

SUMMARY OF THE INVENTION

The present invention is a method for locating in one perspective view a point of interest designated in another perspective view where the viewing directions of the two views are significantly non-parallel.

According to the teachings of the present invention there is provided, a method for identifying within a working image of a scene a point of interest designated within a designation image of a scene, the designation image being taken along a first viewing direction and the working image being taken along a second viewing direction, the second viewing direction being significantly non-parallel to the first viewing direction, the method comprising the steps of: (a) obtaining a designation image of the scene; (b) obtaining a working image of the scene; (c) correlating the designation image and the working image with each other, directly or by correlating each of the designation image and the working image with a common reference image, so as to derive an interrelation between the designation image and the working image; and (d) employing the interrelation between the designation image and the working image to derive a location within the working image of a point of interest designated within the designation image, characterized in that the method further comprises: (e) obtaining a secondary designation image taken along a viewing direction displaced from, but similar to, the first viewing direction; and (f) co-processing the designation image and the secondary designation image to derive range information relating to a plurality of pixels in the designation image, thereby defining a partial relative three-dimensional model of a portion of the scene relative to the viewing direction of the designation image, wherein the partial relative three-dimensional model is used in the step of correlating.

According to a further feature of the present invention, the step of correlating includes employing the range information to generate a simulated image generated by warping the designation image to approximate a view taken along the second viewing direction and correlating the working image with the simulated image.

According to a further feature of the present invention, the step of correlating includes correlating each of the designation image and the working image with a reference image taken along a reference viewing direction, and wherein the partial relative three-dimensional model is used to derive a local relative depth map for at least a subregion of the reference image.

According to a further feature of the present invention, the reference viewing direction is intermediate to the first and second viewing directions.

According to a further feature of the present invention, the reference image is a geographically anchored reference image, and wherein the local relative depth map is a local relative digital elevation map for at least a subregion of the geographically anchored reference image.

According to a further feature of the present invention, the designation image and the working image are derived from different imaging sensors.

There is also provided according to the teachings of the present invention, a method for identifying within a working image of a scene a point of interest designated within a designation image of a scene, the designation image being taken along a first viewing direction and the working image being taken along a second viewing direction, the second viewing direction being significantly non-parallel to the first viewing direction, the method comprising the steps of: (a) obtaining a designation image of the scene taken along the first viewing direction; (b) obtaining a secondary designation image taken along a viewing direction displaced from, but similar to, the first viewing direction; (c) co-processing the designation image and the secondary designation image to derive range information relating to a plurality of pixels in the designation image, thereby defining a partial relative three-dimensional model of a portion of the scene relative to the viewing direction of the designation image; (d) obtaining a working image of the scene taken along the second viewing direction; (e) employing the range information to generate a simulated image generated by warping the designation image to approximate a view taken along the second viewing direction; (f) correlating the working image with the simulated image so as to derive an interrelation between the designation image and the working image; and (g) employing the interrelation between the designation image and the working image to derive a location within the working image of a point of interest designated within the designation image.

There is also provided according to the teachings of the present invention, a method for identifying within a working image of a scene a point of interest designated within a designation image of a scene, the designation image being taken along a first viewing direction and the working image being taken along a second viewing direction, the second viewing direction being significantly non-parallel to the first viewing direction, the method comprising the steps of (a) obtaining a designation image of the scene taken along the first viewing direction; (b) obtaining a secondary designation image taken along a viewing direction displaced from, but similar to, the first viewing direction; (c) co-processing the designation image and the secondary designation image to derive range information relating to a plurality of pixels in the designation image; (d) correlating the designation image with a reference image taken along a reference viewing direction so as to derive an interrelation between the designation image and the reference image, the range information being used to derive a local relative depth map for at least a subregion of the reference image; (e) correlating the working image with the reference image so as to derive an interrelation between the reference image and the working image, the correlating being performed using the local relative depth map; and (f) employing the interrelations between the designation image and the reference image and between the working image and the reference image to derive a location within the working image of a point of interest designated within the designation image.

According to a further feature of the present invention, the reference viewing direction is intermediate to the first and second viewing directions.

According to a further feature of the present invention, the reference image is a geographically anchored reference image, and wherein the local relative depth map is a local relative digital elevation map for at least a subregion of the geographically anchored reference image.

BRIEF DESCRIPTION OF THE DRAWINGS

The invention is herein described, by way of example only, with reference to the accompanying drawings, wherein:

FIG. 2 is a flow chart illustrating a first implementation of a method for transferring points of interest between images taken from different viewing directions according to the teachings of the present invention; and FIG. 3 is a flow chart illustrating a second implementation of a method for transferring points of interest between images taken from different viewing directions according to the teachings of the present invention.

DESCRIPTION OF THE PREFERRED EMBODIMENTS

Figure 1:
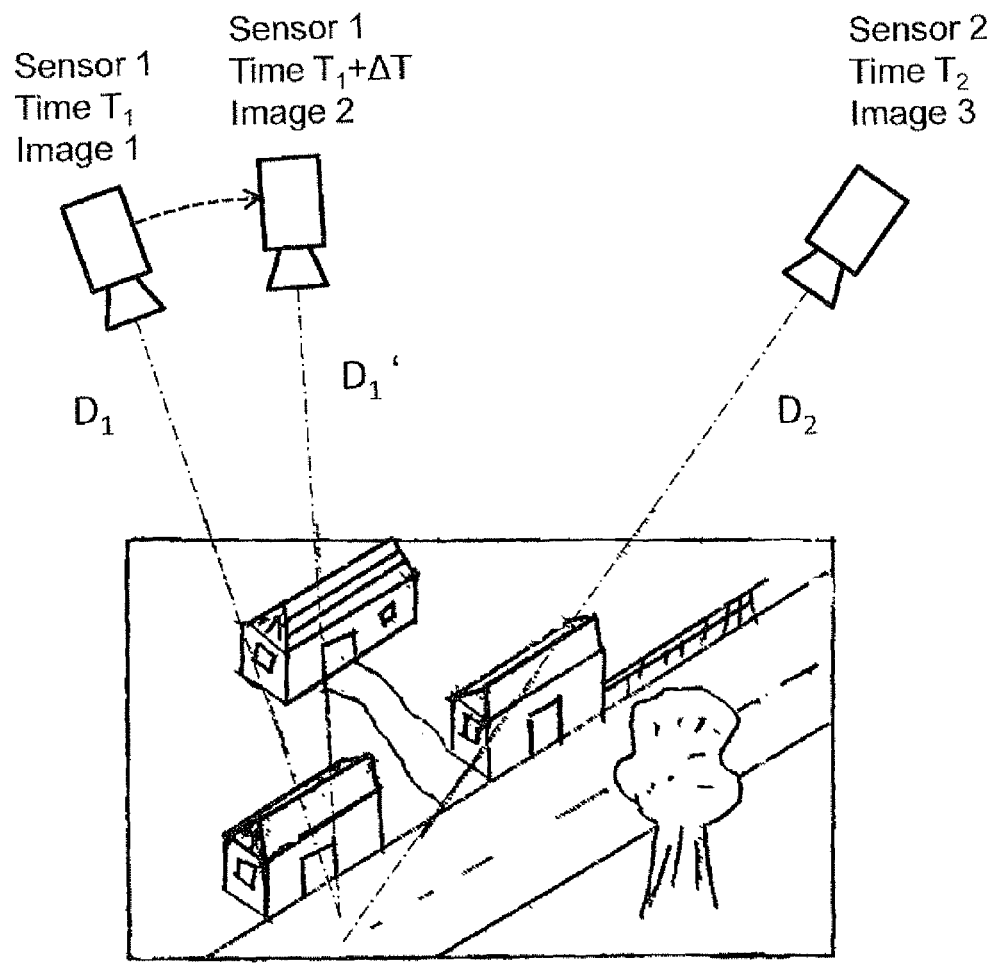
FIG. 1 is a schematic representation of a scenario in which the present invention will be illustrated wherein two imaging sensors acquire images of an urban scene from different viewing directions.

The present invention is a method for transferring points of interest between images taken from different viewing directions, and corresponding systems for implementing such a method.

The principles and operation of systems and methods according to the present invention may be better understood with reference to the drawings and the accompanying description.

Referring now to the drawings, FIG. 1 illustrates the scenario in which the method of the present invention is typically used. Specifically, FIG. 1 illustrates a situation where a first imaging sensor, designated "Sensor 1", acquires an image, designated "Image 1", of a scene of interest, the image being acquired at a time $T_1$ and along a first viewing direction $D_1$. An imaging sensor "Sensor 2", which may be another sensor or may be a later (or earlier) use of the same physical sensor as Sensor 1, acquires an image, designated "Image 3", of an overlapping scene at a time $T_2$ and along a different viewing direction $D_2$. The present invention is primarily applicable to situations in which viewing directions $D_1$ and $D_2$ are significantly non-parallel, i.e., at least 20 degrees apart. Although not limited to such cases, the present invention is of particular significance in situations where the viewing directions are highly non-parallel, such as more than 60 degrees apart, and often as much as 90 degrees apart or more. In such cases, and particularly when viewing scenes with significant vertical topography such as buildings, simple image correlation between Image 1 and Image 3 is typically not possible, or at least not reliable. Furthermore, the present invention primarily addresses cases where no full three-dimensional model of the scene is available, either because insufficient data is available to construct a full model or simply because no such model has been calculated.

In general terms, the method of the present invention includes obtaining a second image of the scene ("Image 2") which is taken along a viewing direction $D_1'$ displaced from, but similar to, first viewing direction $D_1$. For this purpose, "similar viewing directions" are taken to be viewing directions sufficiently close in angle that conventional image correlation can typically be performed reliably by standard techniques, and in this context, typically refers to directions differing by less than about 30 degrees. Preferably, the change in viewing direction is kept much smaller than this, and the images are sampled in quick succession (i.e., at times $T_1$ and $T_1+\Delta T$) by the same imaging sensor in order to maximize the similarity between the images and make correlation of the images as reliable as possible. Optionally, more than two images may be used, for example, a relatively short video sequence. Even in such cases, the angular spacing of the furthest-spaced images used is kept sufficiently small that reliable pixel-to-pixel registration can be achieved over a majority of the overlapping region of the images. Once acquired, Image 1 and Image 2 are co-processed to derive range information relating to a plurality of pixels in Image 1, thereby defining a partial relative three-dimensional model of a portion of the scene relative to the viewing directions. This partial relative three-dimensional model, or the corresponding depth data, is then used to facilitate correlating Image 1 and Image 3, either directly or by correlating each with a common reference image, so as to derive an interrelation between Image 1 and Image 3. This interrelation is then employed to derive a location within one of the images corresponding to a point of interest designated within the other of the images.

At this point, it will already be clear that the method of the present invention is highly advantageous, providing additional depth information for one of the viewing directions to facilitate accurate and reliable correlation to images from widely differing viewing angles, even when insufficient information or resources are available for derivation of a full three-dimensional model. Two practical implementations of how the additional information may be used will be presented below with reference to FIGS. 2 and 3, respectively.

Before proceeding with the details of practical implementations of the above principles, it will be helpful to define certain terminology as used herein the description and claims. Firstly, Image 1 and Image 2 are referred to herein as "designation images" while Image 3 is referred to as a "working image". This terminology is used merely as a convenience, and is chosen according to the most common usage of the system and method of the present invention according to which a point of interest is designated in one of Images 1 and 2, and needs to be identified in a later real-time "working image" (Image 3). It will be appreciated however that, once a transformation has been established between Image 1 and Image 3, points of interest may readily be transferred in either direction. Thus, an application where a point is designated in the "working image" and the corresponding point is identified in the "designation image" also falls within the scope of the present invention.

The term "point of interest" is used to refer to any location or region designated in one image which is to be identified in another image. In many cases, the "point" will be identified as a pixel, or small group of pixels, in the image in which it is designated. In certain cases, the "point of interest" may be a larger area determined by a boundary line, in which case each point used to specify the boundary may be regarded as a "point of interest" in its own right. Furthermore, in certain cases, the point of interest may be specified with sub-pixel accuracy relative to the designation images themselves, for example, if a plurality of designation images are used to derive a higher resolution (or "super-resolution") image. The resolution with which the point of interest is specified may differ between the working image and the designation image.

The term "correlating" is used herein in the description and claims to refer to any processing of two or more images which results in determining an interrelation between the images. The term "interrelation" is used herein to refer to a mapping, transformation or other relation which defines correspondence of at least a subset of pixels between the images in question.

The term "warping" is used herein to refer to any image processing technique which renders an image sampled along a first viewing direction so as to approximate how the image would appear if viewed along a second viewing direction. Although the term "warping" thus defined would include affine transformations and other planar transformations, the "warping" referred to in the present invention typically employs depth information associated with the image, as will be detailed below. As a result, in certain cases, the resulting warped image may be only a partial image, with certain image data from the starting image discarded due to being obscured in the warped view, and other data expected to be visible from the new viewing direction unavailable in the starting image.

The phrase "viewing direction" is used herein to refer to a direction corresponding to the optical axis of an image sensor at the time an image is sampled. The angle between two viewing directions is defined intuitively, and may be defined algebraically as the arccosine of the scalar product of unit vectors along the two viewing directions.

A third viewing direction is considered to be "intermediate" to two other viewing directions if the angle formed between the third viewing direction and each of the other viewing directions is less than the angle measured directly between the other two viewing directions.

Reference is made to range information generating a "partial relative three-dimensional model of a portion of the scene." It should be noted that the partial model of the present invention is effectively a three-dimensional impression of the scene taken from a single viewing direction, in clear contrast to the panoramic models required by the aforementioned SFM techniques. Specifically, according to the conventional SFM approach, a partial three-dimensional model constructed based on views taken only from the east side of a group of buildings (and hence lacking all information regarding the westward facing surfaces of the buildings) would be assumed to be useless for correlation with another view taken from the west side of the buildings. The techniques of the present invention address this problem of incomplete information, or insufficient resources to assemble the information, as detailed further below.

The phrase "local relative depth map" is used to refer to a collection of relative depth data associated with locations within a two dimensional image. As will become clear from the description below, the depth map in question need not correspond to range data from any particular image sensor. "Depth" in this context refers to distance in a direction generally parallel with the effective viewing direction for the image in question. In the case of a high-altitude aerial photo, satellite photo or an "orthophoto" (a processed image with an effectively vertical viewing direction at all points), this becomes a "local relative digital elevation map." The depth map is described as "local" in the sense that it may cover a limited subregion or "locale" of a much more extensive image, for example, from a geographical image database. The depth map is described as "relative" in the sense that it is internally consistent, but need not be determined in absolute position. The density of the depth map may be the same as, lesser than, or greater than, the pixel density of the corresponding image.

Referring now again to FIG. 1, it is generally assumed as a starting point for the present invention that approximate data is available for the positions and viewing directions of the Image Sensors. Such information may be derived from any one, or combination, of a wide range of sensor systems commonly in use, including but not limited to: GPS; inertial sensor systems; optical tracking; and image correlation to geographic reference databases. The tracking technologies need not be the same for both image sensors.

The image sensor used for deriving the designation images may be distinct from the image sensor for deriving the working image, and may employ different imaging technology and/or be sensitive to different wavelengths of visible or invisible light. Thus, for example, the designation images may be color images while the working image is a gray image, or vice versa, or one or both of the image sensors may operate in one or more infrared wavelength band. Despite all of the above options, an implementation wherein the same image sensor is used at different times to sense the designation images and the working image also falls within the scope of the present invention.

The present invention is applicable to any situation where a scene is viewed by imaging sensors from significantly non-parallel viewing directions, independent of the platform supporting the imaging sensors. In certain cases, one or more of the sensors may be mounted on a land-based platform, for example, a fixed vantage point or a vehicle located with a suitable range of view. More typically, the invention is applied to images retrieved from sensors mounted on flying or otherwise airborne platforms. Examples of platforms include, but are not limited to: manned aircraft; unmanned aerial vehicles ("UAVs") of all types and sizes, lighter-than-air floating platforms, ballistic projectiles and guided weapons.

Turning now to FIG. 2, there is illustrated a first embodiment of a method according to the teachings of the present invention for identifying within a working image of a scene a point of interest designated within a designation image of a scene. In this embodiment, correlation is performed directly between the designation images and the working image, assisted by the aforementioned range information.

Specifically, steps 100 and 102 correspond to sampling of designation images, Image 1 and Image 2, at times T1 and (T1+ΔT), respectively. As stated before, the two images are preferably acquired by the same imaging sensor with differing but similar viewing directions, and preferably in quick succession, i.e., with a small ΔT, in order to ensure similar lighting conditions and minimize the effect of any moving objects. In a typical case, the images may be sampled from a moving UAV at times separated by less than a second.

Then, at step 104, the two designation images, together with the corresponding sensor data, i.e., image sensor position and viewing direction at the time of sampling the image, are co-processed by image registration techniques to derive range information relating to at least a subset of the pixels in Image 1. (Parenthetically, it will be noted that Image 1 and Image 2 are interchangeable for this purpose, such that the later sampled image may be considered Image 1 and ΔT may be defined as negative.) The result is referred to as a "dense range map" to the extent that it preferably provides range data at locations in the image sufficiently densely packed to form a reliable indication of major surfaces of buildings within the field of view of the designation images. In most preferred cases, the range data is derived with a spacing in the same order of magnitude as the pixel resolution of the image, and in one particularly preferred implementation, for each pixel of Image 1.

Independent of the above process, Image Sensor 2 samples Image 3 at some time T2 (step 106), and corresponding position and viewing direction data are determined. The task to be performed by the system and method of the present invention is to allow identification of corresponding points of interest between Image 1 and Image 3.

To this end, according to this embodiment of the present invention, step 108 employs the range information from step 104 and the sensor data from step 106 to generate a simulated image generated by warping designation image, Image 1, to approximate a view taken along the viewing direction of Image 3. Then, at step 110, this simulated image is correlated Image 3. The parameters of this correlation combined with the parameters of the warping together define an interrelation (a global transformation or a set of pixel-to-pixel correspondences) between Image 1 and Image 3. This interrelation then allows identification in either image of a point of interest designated in the other image.

Turning now to FIG. 3, there is shown an alternative embodiment of the method of the present invention. This embodiment is generally similar to the embodiment of FIG. 2, but employs a reference image taken along a reference viewing direction.

Thus, as before, designation images, Image 1 and Image 2, are sampled at times T1 and (T1+ΔT), corresponding to steps 200 and 202 respectively. At step 204, the two designation images, together with the accompanying data (to be described more fully below), are co-processed by image registration techniques to derive a dense range map relating to at least a subset of the pixels in Image 1. At least one of the designation images is registered with the reference image (obtained at 205) to generate a transformation TR1 (step 206) which interrelates Image 1 with the reference image, and the transformation together with the dense range map are used at step 208 to derive a local relative depth map for at least a subregion of the reference image. Most preferably, registration step 206 and a parallel process 206' for Image 2 are performed prior to the co-processing of step 204 and the additional data made available through derivation of the transformations TR1 and TR2 are used to further refine the accuracy of the co-processing. Additionally, or alternatively, the local relative depth map derived by casting the partial relative three-dimensional model of the scene along the reference viewing direction is used to enhance or render more robust the correlation of Image 1 with the reference image. It will be noted that transformation TR1, which again may be a global transformation or a pixel-by-pixel mapping, already provides sufficient information to map points of interest in both directions between Image 1 and the reference image, as indicated by step 210.

At step 212, Image Sensor 2 samples Image 3 at some time T2, and corresponding position and viewing direction data are determined. The image and sensor data are then used, together with the local relative depth map, to correlate Image 3 to the reference image to generate transformation TR3 (step 214). The availability of the local relative depth map again renders this correlation more reliable and precise than would otherwise be possible. Transformation TR3 then allows mapping of points of interest in both directions between Image 3 and the reference image, as indicated by step 216. Steps 210 and 216, taken together, thus provide for transfer of points of interest between Image 1 and Image 3.

While the above described method may be applied with substantially any reference image and reference viewing direction, it is clearly advantageous to choose a reference viewing direction which is intermediate to the first and second viewing directions, thereby rendering the angular discrepancy between images to be correlated. For this reason, in a wide range of applications, a reference image with a near-vertical viewing direction is advantageous as an intermediate angle reference image for correlating between images taken from opposing directions of a region of interest.

Clearly, a likely choice for a source of reference images is a database of geographically anchored reference images. The present invention may be employed in a case where no digital terrain map (DTM) is available, or may employ a DTM where available in deriving the registration of the designation image(s) to the reference image. Even in the latter case, however, it should be noted that the local relative depth map derived from the designation images need not be registered with the DIM. Since the local relative depth map typically has a much higher resolution than a wide-area DTM, and is up-to-date as of the time of sampling of Images 1 and 2, it provides an important tool for achieving more reliable and precise registration between Image 3 and the reference image.

According to another optional feature of this embodiment, as mentioned in the background section above, the primary choice of features common to widely spaced viewing directions in a dense urban landscape are typically associated with roofs of buildings. Accordingly, in certain implementations, it may be advantageous to apply a filter or mask based on the local relative depth map to selectively give increased weight during the registration process to pixels of the reference image identified as corresponding to rooftops or other elevated features.

It will be appreciated that the above descriptions are intended only to serve as examples, and that many other embodiments are possible within the scope of the present invention as defined in the appended claims.

What is claimed is:

1. A method for identifying within a working image of a scene a point of interest designated within a designation image of the scene, the designation image being taken along a first viewing direction and the working image being taken along a second viewing direction, the second viewing direction being significantly non-parallel to the first viewing direction, the method comprising the steps of:
   (a) obtaining a designation image of the scene;
   (b) obtaining a working image of the scene;
   (c) correlating said designation image and said working image with each other, directly or by correlating each of said designation image and said working image with a common reference image, so as to derive an interrelation between said designation image and said working image; and
   (d) employing said interrelation between said designation image and said working image to derive a location within said working image of a point of interest designated within said designation image, characterized in that the method further comprises:
   (e) obtaining a secondary designation image taken along a viewing direction displaced from, but similar to, the first viewing direction, said designation image and said secondary designation image being a pair of similar images with similar resolution and similar angular field of view; and
   (f) co-processing said designation image and said secondary designation image to derive range information relating to a plurality of pixels in said designation image, thereby defining a partial relative three-dimensional model of a portion of the scene relative to the viewing direction of said designation image, wherein said step of correlating includes employing said partial relative three-dimensional model to generate a simulated image generated by warping said designation image to approximate a view taken along said second viewing direction and correlating said working image with said simulated image,
   and wherein said steps of correlating, employing and co-processing are implemented using at least one processing system comprising at least one processor.

2. The method of claim 1, wherein said designation image and said working image are derived from different imaging sensors.

3. A method for identifying within a working image of a scene a point of interest designated within a designation image of the scene, the designation image being taken along a first viewing direction and the working image being taken along a second viewing direction, the second viewing direction being significantly non-parallel to the first viewing direction, the method comprising the steps of:
   (a) obtaining a designation image of the scene taken along the first viewing direction;
   (b) obtaining a secondary designation image taken along a viewing direction displaced from, but similar to, the first viewing direction, said designation image and said secondary designation image being a pair of similar images with similar resolution and similar angular field of view;
   (c) co-processing said designation image and said secondary designation image to derive range information relating to a plurality of pixels in said designation image, thereby defining a partial relative three-dimensional model of a portion of the scene relative to the viewing direction of said designation image;
   (d) obtaining a working image of the scene taken along the second viewing direction;
   (e) employing said range information to generate a simulated image generated by warping said designation image to approximate a view taken along said second viewing direction;
   (f) correlating said working image with said simulated image so as to derive an interrelation between said designation image and said working image; and
   (g) employing said interrelation between said designation image and said working image to derive a location within said working image of a point of interest designated within said designation image,
   wherein said steps of co-processing, employing said range information, correlating and employing said interrelation are implemented using at least one processing system comprising at least one processor.

4. A method for identifying within a working image of a scene a point of interest designated within a designation image of the scene, the designation image being taken along a first viewing direction and the working image being taken along a second viewing direction, the second viewing direction being significantly non-parallel to the first viewing direction, the method comprising the steps of:
   (a) obtaining a designation image of the scene taken along the first viewing direction;
   (b) obtaining a secondary designation image taken along a viewing direction displaced from, but similar to, the first viewing direction, said designation image and said secondary designation image being a pair of similar images with similar resolution and similar angular field of view;
   (c) co-processing said designation image and said secondary designation image to derive range information relating to a plurality of pixels in said designation image;
   (d) correlating said designation image with a reference image taken along a reference viewing direction so as to derive an interrelation between said designation image and said reference image, said range information being used to derive a local relative depth map for at least a subregion of said reference image;
   (e) correlating said working image with said reference image so as to derive an interrelation between said reference image and said working image, said correlating being performed using said local relative depth map; and
   (f) employing said interrelations between said designation image and said reference image and between said working image and said reference image to derive a location within said working image of a point of interest designated within said designation image,
   wherein said steps of co-processing, correlating said designation image, correlating said working image and employing are implemented using at least one processing system comprising at least one processor.

5. The method of claim 4, wherein said reference viewing direction is intermediate to said first and second viewing directions.

6. The method of claim 4, wherein said reference image is a geographically anchored reference image, and wherein said local relative depth map is a local relative digital elevation map for at least a subregion of said geographically anchored reference image.

7. The method of claim 1, wherein said simulated image is a partial image containing data only for regions of said designation image expected to be visible in said second viewing direction.

8. The method of claim 1, wherein the second viewing direction differs from said first viewing direction by at least 60 degrees.

9. The method of claim 1, wherein the second viewing direction differs from said first viewing direction by at least 90 degrees.

10. The method of claim 1, wherein said designation image and said working image are views of buildings from different directions and wherein the first and second viewing directions are shallow angle viewing directions.

11. The method of claim 1, wherein a majority of features in said working image do not have corresponding features in said designation image.

12. The method of claim 1, wherein said designation image and said secondary designation image are sampled sequentially by a first camera.

13. The method of claim 3, wherein said designation image and said secondary designation image are sampled sequentially by a first camera.

14. The method of claim 4, wherein said designation image and said secondary designation image are sampled sequentially by a first camera.

15. The method of claim 3, wherein said designation image and said working image are derived from different imaging sensors.

16. The method of claim 4, wherein said designation image and said working image are derived from different imaging sensors.

* * * * *